United States Patent
Zhang et al.

(10) Patent No.: US 10,508,654 B2
(45) Date of Patent: Dec. 17, 2019

(54) APPARATUS, SYSTEM, AND DEVICE FOR COOLING

(71) Applicant: Lenovo (Beijing) Limited, Beijing (CN)

(72) Inventors: Zhe Cheng Zhang, Beijing (CN); Ming Chang Zhuang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 328 days.

(21) Appl. No.: 15/453,292

(22) Filed: Mar. 8, 2017

(65) Prior Publication Data

US 2017/0260986 A1    Sep. 14, 2017

(30) Foreign Application Priority Data

Mar. 8, 2016  (CN) .......................... 2016 1 0130396

(51) Int. Cl.
| | |
|---|---|
| *F04D 25/08* | (2006.01) |
| *F04D 25/06* | (2006.01) |
| *F04D 29/053* | (2006.01) |
| *F04D 29/34* | (2006.01) |
| *H02K 5/20* | (2006.01) |
| *H02K 7/00* | (2006.01) |
| *H02K 7/14* | (2006.01) |

(52) U.S. Cl.
CPC ............ *F04D 25/082* (2013.01); *F04D 25/06* (2013.01); *F04D 29/053* (2013.01); *F04D 29/34* (2013.01); *H02K 5/20* (2013.01); *H02K 7/003* (2013.01); *H02K 7/14* (2013.01)

(58) Field of Classification Search
CPC ...... F04D 25/082; F04D 25/06; F04D 29/053; F04D 29/34; H02K 7/003; H02K 7/14; H02K 5/20

See application file for complete search history.

(56) References Cited

U.S. PATENT DOCUMENTS

| | | | | | |
|---|---|---|---|---|---|
| 3,577,002 | A | * | 5/1971 | Hall | ........................ H02K 7/003 |
| | | | | | 290/46 |
| 6,231,407 | B1 | * | 5/2001 | Hein | ........................ B63H 5/07 |
| | | | | | 440/6 |

FOREIGN PATENT DOCUMENTS

| | | |
|---|---|---|
| CN | 101325352 A | 12/2008 |
| CN | 201774392 U | 3/2011 |
| CN | 102064634 A | 5/2011 |
| CN | 103329403 A | 9/2013 |
| CN | 103650294 A | 3/2014 |
| CN | 203883617 U | 10/2014 |
| JP | 2004159402 A | 6/2004 |
| JP | 2015192474 A | 11/2015 |

OTHER PUBLICATIONS

"First Office Action for Application No. 201610130396.0" The State Intellectual Property Office of People's Republic of China, dated Aug. 2, 2017, pp. 1-7.

* cited by examiner

*Primary Examiner* — Igor Kershteyn

(74) *Attorney, Agent, or Firm* — Kunzler Bean & Adamson

(57) ABSTRACT

An apparatus for cooling is disclosed. One apparatus includes a motor body and a shaft extending through the motor body and configured to rotate in response to operation of the motor body. The shaft includes a first through-hole extending axially between a first end of the shaft and a second end of the shaft. The first through-hole is configured to receive a fluid to cool the motor body.

19 Claims, 5 Drawing Sheets

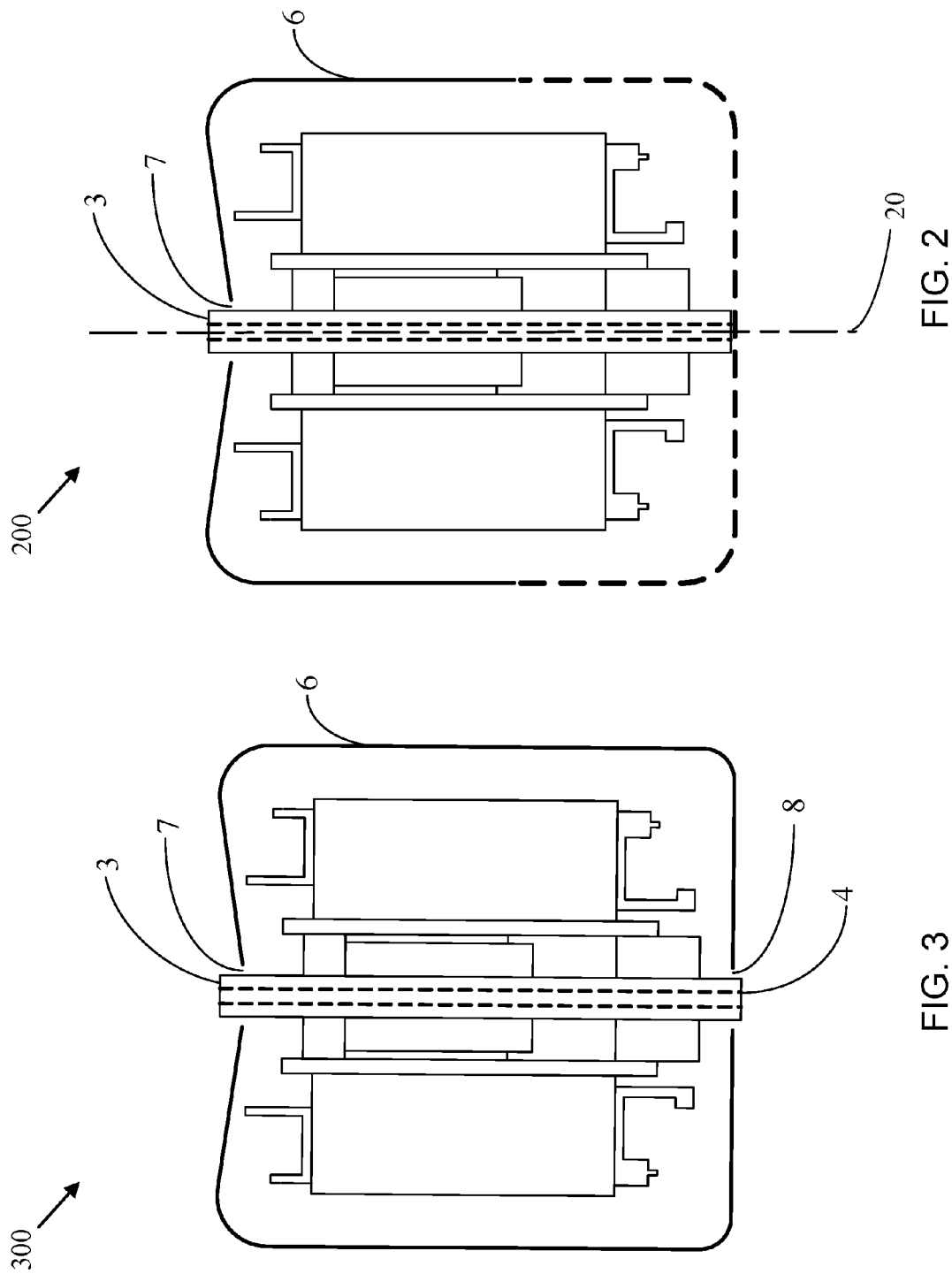

APPARATUS, SYSTEM, AND DEVICE FOR COOLING

FIELD

The subject matter disclosed herein relates to the devices, and in particular, to an apparatus, system, and device for cooling devices.

BACKGROUND

A motor is an electromagnetic apparatus that converts electrical energy to mechanical energy. In certain configurations, a purpose of a motor is to generate driving torque. In such configurations, the motor may be used in various electronic devices to enable selected components of the electronic devices to move mechanically.

A motor may have a shaft that is driven to rotate such that a component coupled to the shaft is also rotated. The lifespan of a bearing for supporting the shaft to rotate in the motor may be related to the working temperature of the shaft. During operation of the motor, the shaft may generate heat, and if the shaft operates at a high temperature for a certain period of time, the lifespan of the bearing and/or motor may be influenced.

SUMMARY

An apparatus for cooling is disclosed. Systems and devices also perform the functions of the apparatus. The apparatus includes a motor body and a shaft extending through the motor body and configured to rotate in response to operation of the motor body. The shaft includes a first through-hole extending axially between a first end of the shaft and a second end of the shaft. The first through-hole is configured to receive a fluid to cool the motor body.

In one embodiment, the apparatus includes a housing having a second through-hole. In such an embodiment, the motor body is at least partially disposed in the housing, and the first end of the shaft extends through the second through-hole. In certain embodiments, a first axis of the first through-hole and a second axis of the second through-hole correspond to a common axis. In some embodiments, the motor body is entirely disposed in the housing, the housing includes a third through-hole opposite the second through-hole, and the second end of the shaft extends through the third through-hole. In various embodiments, a diameter of the first through-hole is within a preset range.

In one embodiment, the apparatus includes a fan blade coupled to the shaft and configured to rotate in response to rotation of the shaft. In certain embodiments, the fan blade includes a fan through-hole extending axially between a first end of the fan blade and a second end of the fan blade, and a first end of the shaft extends into the fan through-hole. In some embodiments, the fan blade is arranged at the first end of the shaft. In various embodiments, the fan blade includes a connector for coupling the fan blade to the shaft.

A system for cooling includes a motor body and a shaft extending through the motor body and configured to rotate in response to operation of the motor body. The shaft includes a first through-hole extending axially between a first end of the shaft and a second end of the shaft. The first through-hole is configured to receive a fluid to cool the motor body. The system also includes a housing. The motor body is at least partially disposed in the housing. The system includes a fan blade coupled to the shaft and configured to rotate in response to rotation of the shaft.

In some embodiments, the fan blade includes a connector for coupling the fan blade to the shaft. In various embodiments, the housing includes a second through-hole, and the first end of the shaft extends through the second through-hole. In certain embodiments, a first axis of the first through-hole and a second axis of the second through-hole correspond to a common axis. In one embodiment, the motor body is entirely disposed in the housing, the housing includes a third through-hole opposite the second through-hole, and the second end of the shaft extends through the third through-hole.

In certain embodiments, the fan blade includes a fan through-hole extending axially between a first end of the fan blade and a second end of the fan blade, and a first end of the shaft extends into the fan through-hole. In various embodiments, the fan blade is arranged at the first end of the shaft. In some embodiments, a diameter of the first through-hole is within a preset range.

A device for cooling includes a shaft extending through a motor body and configured to rotate in response to operation of the motor body. The shaft includes a first through-hole extending axially between a first end of the shaft and a second end of the shaft. The first through-hole is configured to receive a fluid to cool the motor body.

In one embodiment, the device includes a fan blade coupled to the shaft and configured to rotate in response to rotation of the shaft. In certain embodiments, the fan blade includes a fan through-hole extending axially between a first end of the fan blade and a second end of the fan blade, and a first end of the shaft extends into the fan through-hole.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a schematic diagram of another embodiment of a device for cooling;

FIG. 3 is a schematic diagram of a further embodiment of a device for cooling;

DETAILED DESCRIPTION

Figure 1:
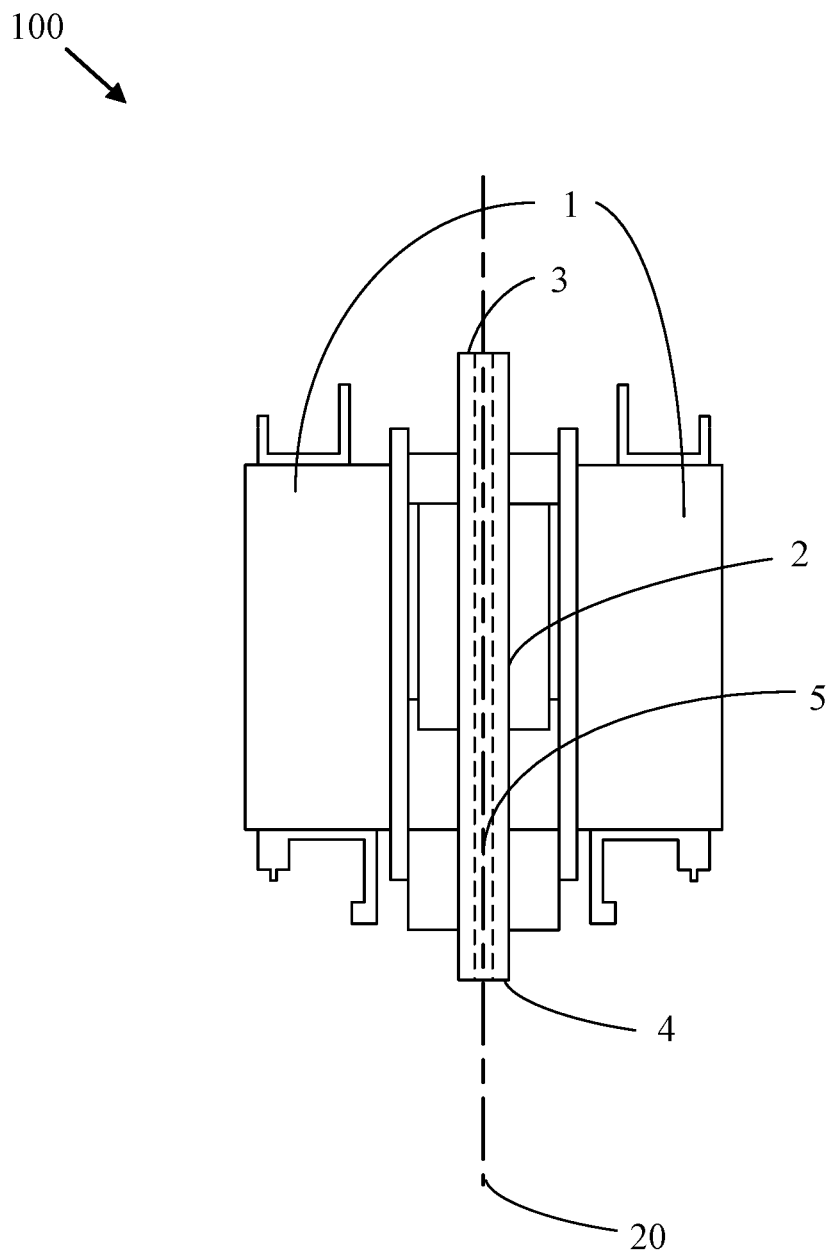
FIG. 1 is a schematic diagram of an embodiment of a device for cooling.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic diagram of an embodiment of a device 100 for cooling. In some embodiments, the device 100 may be a motor, as illustrated. Specifically, the device 100 includes a motor body 1 and a central shaft 2. In certain embodiments, the central shaft 2 extends through the motor body 1 and is configured to rotate in response to operation of the motor body 1. The central shaft 2 includes a first through-hole 5 extending axially through an axis 20 of the central shaft 2 between a first end 3 of the central shaft 2 and a second end 4 of the central shaft 2. The first end 3 is opposite to the second end 4 in a length direction along the axis 20 of the central shaft 2. When the device 100 is in operation, the central shaft 2 may be cooled by fluid flow (e.g., air, gas, liquid, etc.) through the first through-hole 5.

The device 100 may be any suitable type of motor, such as a direct current ("DC") motor, an alternating current ("AC") motor, a brushless DC motor, a brush DC motor, a synchronous motor, an asynchronous motor, and/or the like.

As may be appreciated, the motor body 1 may vary based on a type of motor. For example, the motor body 1 of a brushless DC motor may include components such as a permanent magnet rotor, a multi-polar winding stator, a position sensor, and/or a bearing. In another example, the motor body 1 of an electromagnetic DC motor may include components such as a stator pole, a rotor (armature), and inverter (commutator), a brush, and/or a bearing. Regardless of which type of motor is used, a component of the motor is used to drive the central shaft 2 to rotate.

In some embodiments, the central shaft 2 of the motor may be disposed in a central portion (e.g., the center) of the motor body 1 of the motor. For example, the central shaft 2 may pass through a central portion of the motor body 1. In certain embodiments, the central shaft 2 may be cylindrical or another shape. In various embodiments, the central shaft 2 may include any suitable material. For example, the material may be a hard metal or alloy, such as iron, stainless steel, low carbon steel, and/or the like.

The first through-hole 5 may be a through-hole having any shape, such as a round through-hole, an oval through-hole, a square through-hole, and/or the like. The first through-hole 5 in the central shaft 2 may be formed using any suitable method. For example, the through-hole 5 in the central shaft 2 may be drilled using a drilling machine, the through-hole 5 in the central shaft 2 may be drilled using a discharge punching machine, or the like. The first through-hole 5 may have a diameter of any suitable size, such as being within a preset (e.g., predetermined) range.

While the central shaft 2 having the first through-hole 5 is in operation, fluid (e.g., air, gas, liquid) may pass through the first through-hole 5 thereby transferring heat from the central shaft 2 to the fluid. Accordingly, a service life of a motor responsive to excessive temperatures of the central shaft 2 may be extended by reducing temperatures of the central shaft 2.

FIG. 2 is a schematic diagram of another embodiment of a device 200 for cooling. As illustrated, the device 200 includes a housing 6 having a second through-hole 7. Moreover, the housing 6 wraps around a part of the motor body 1. For example, the housing 6 indicated by solid lines may indicate a portion of the housing 6 that is disposed around the motor body 1 and the dashed lines may indicate a portion of the housing 6 that may or may not be disposed around the motor body 1. As another example, the housing 6 may wrap around the whole motor body 1 as indicated by the solid lines and the optional dotted lines of FIG. 2. Any suitable component may be considered the housing 6 as long at least a portion of the motor body 1 is disposed in the component.

The second through-hole 7 may be a through-hole having any suitable shape. For example, the second through-hole 7 may be a round through-hole, a rectangular through-hole, an oval through-hole, and/or the like. In some embodiments, the axis 20 may extend axially through a central portion of the first through-hole 5 and the second through hole 7.

In various embodiments, an aperture size of the second through-hole 7 may be any suitable size to facilitate the first end 3 of the central shaft 2 extending through the second through-hole 7. In some embodiments, an aperture size of the second through-hole 7 may only need to enable the central shaft 2 to pass therethrough. In certain embodiments, the first end 3 of the central shaft 2 may be disposed within the housing 6 and may not pass through the second through-hole 7. In such embodiments, the first end 3 of the central shaft 2 may be visible through the second through-hole 7 in the direction vertically over the device 200. In various embodiments, the aperture size of the second through-hole 7 may facilitate air to pass therethrough.

In certain embodiments, a position of the second through-hole 7 may be just opposite to the central shaft 2 such that the first end 3 of the central shaft 2 may pass through the second through-hole 7 and/or air may flow into the first through-hole 5 of the central shaft 2 through the second through-hole 7. Therefore the central shaft 2 may be cooled by the air flow, thereby reducing an impact on a service life of the device 200 due to excessive temperatures of the central shaft 2. In some embodiments, a cross section of the first through-hole 5 and a cross section of the second through-hole 7 have substantially the same hole center.

In various embodiments, the first through-hole 5 may be aligned with the second through-hole 7. By aligning the first through-hole 5 and the second through-hole 7 an appearance of the device 200 may be enhanced.

FIG. 3 is a schematic diagram of a further embodiment of a device 300 for cooling. As illustrated, the housing 6 of the device 300 may enclose the whole motor body 1. Moreover, the motor body 1 includes a third through-hole 8 opposite to the second through-hole 7. Therefore, the first end 3 of the central shaft 2 may extend through the second through-hole 7 and/or be disposed opposite to the second through-hole 7, and the second end 4 of the central shaft 2 may extend through the third through-hole 8 and/or be disposed opposite to the third through-hole 8.

By having the second through-hole 7 and the third through-hole 8, air may flow through the first through-hole 5 of the central shaft 2 via the second through-hole 7 and the third through-hole 8 of the housing 6, thereby cooling the central shaft 2. As such, an impact on the service life of the device 300 due to excessive temperatures of the central shaft 2 may be reduced.

In certain embodiments, the aperture of the first through-hole 5 may be set to be within a range (e.g., the first preset range). For example, if the first through-hole 5 is a round through-hole, a diameter of the first through-hole 5 may be set to be within the first preset range. As another example, if the first through-hole 5 is a square through-hole, the diagonal length of the square of the cross section of the first through-hole 5 may be set to be within the first preset range.

In certain embodiments, the central shaft 2 may be a cylinder with the diameter of approximately 5 mm, the first through-hole 5 may be a round through-hole, and the first preset range may be, for example, a diameter of the first through-hole 5 being less than or equal to 1 mm. In various embodiments, the central shaft 2 may provide stability of the motor body 1 and/or facilitate low noise production.

Figure 4:
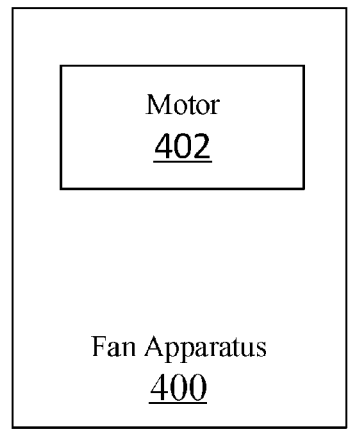
FIG. 4 is a block diagram of an embodiment of a fan apparatus for cooling.

FIG. 4 is a block diagram of an embodiment of a fan apparatus 400 for cooling. The fan apparatus 400 includes a motor 402 that may include any of the devices illustrated in one or more of FIGS. 1 through 3.

Figure 5:
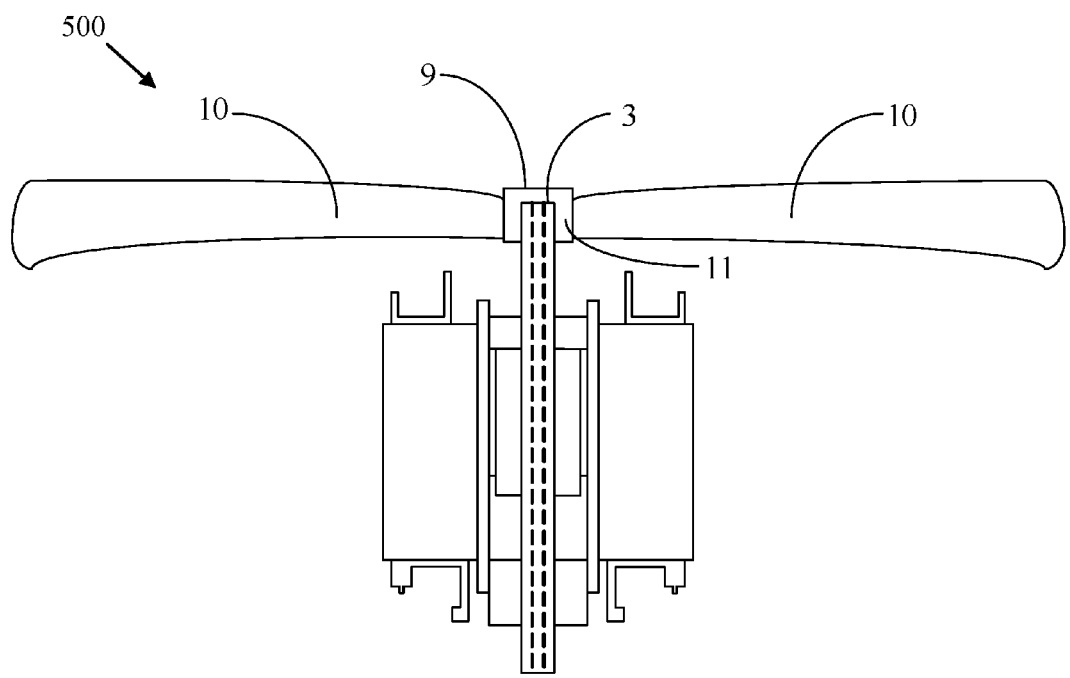
FIG. 5 is a schematic diagram of an embodiment of an apparatus for cooling.

In certain embodiments, the fan apparatus 400 may include a fan blade as illustrated in FIG. 5. The fan blade may include at least one blade and a coupling device. The blade may be coupled (e.g., fixedly coupled) to the coupling device. Moreover, the coupling device may be connected to the first end 3 of the central shaft 2. During operation of the motor body 1, the motor body 1 may drive the coupling device to rotate about the central shaft 2, thereby driving the blade to rotate.

FIG. 5 is a schematic diagram of an embodiment of an apparatus 500 for cooling. As illustrated, the first end 3 of the central shaft 2 is coupled to a fan blade 9, thereby forming a fan apparatus. In certain embodiments, the first end 3 of the central shaft 2 may be coupled (e.g., fixedly coupled) to a coupling device 11 of the fan blade 9. The first end 3 of the central shaft 2 may be coupled to the coupling device 11 in any suitable manner. For example, the first end 3 of the central shaft 2 may be coupled to the coupling device 11 via bonding and/or clamping. In some embodiments, the first end 3 of the central shaft 2 may be shaped to a shape that matches a shape in the coupling device 11 to facilitate insertion of the first end 3 of the central shaft 2 into the coupling device 11. During operation of the apparatus 500, the central shaft 2 is coupled to the coupling device 11 of the fan blade 9, and therefore, rotation of the central shaft 2 drives the coupling device 11 to rotate. Moreover, rotation of the coupling device 11 drives rotation of at least one blade 10 coupled to the coupling device 11. During operation of the apparatus 500, the central shaft 2 may still be cooled through the first through-hole 5 thereby improving a service life of the apparatus 500.

Figure 6:
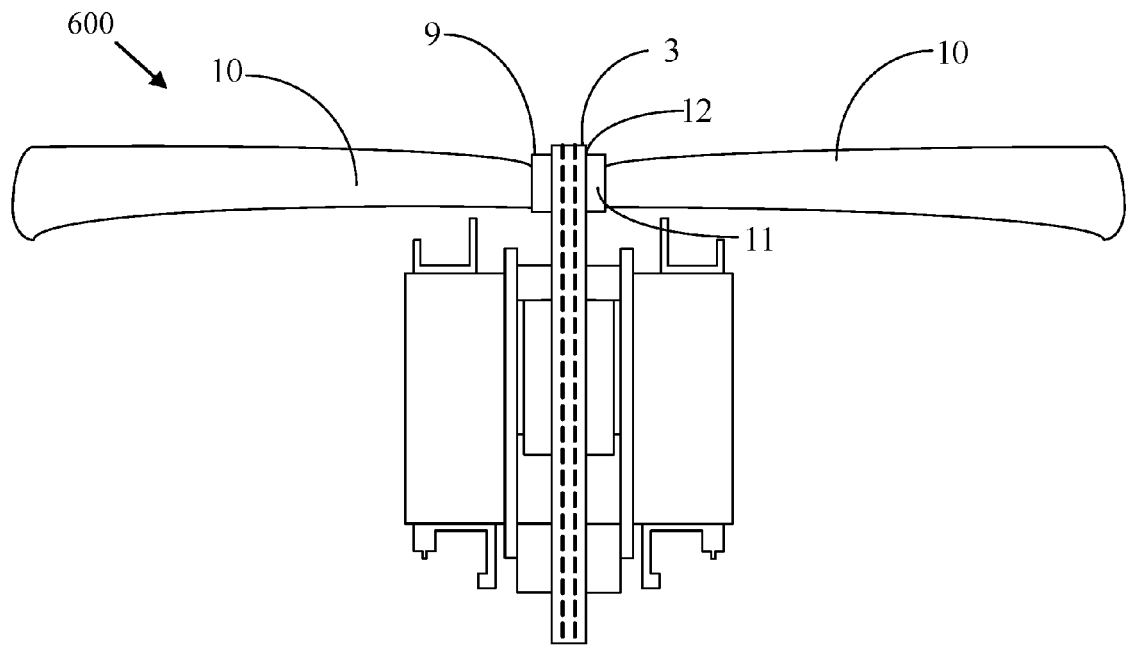
FIG. 6 is a schematic diagram of another embodiment of an apparatus for cooling.

FIG. 6 is a schematic diagram of another embodiment of an apparatus 600 for cooling. As illustrated, the coupling device 11 of the fan blade 9 includes a fourth through-hole 12, and the first end 3 of the central shaft 2 may extend through the fourth through-hole 12. Thus, the first end 3 of the central shaft 2 is not covered by the fan blade 9, in contrast to FIG. 5 in which the first end 3 of the central shaft 2 is covered by the fan blade 9. In certain embodiments, the first end 3 of the central shaft 2 may be coupled to the inner wall of the fourth through-hole 12 through bonding, clamping, threading (e.g., on the first end 3 of the central shaft 2 and in the fourth through-hole 12), or the like.

As illustrated, the central shaft 2 may pass through the coupling device 11 of the fan blade 9. During operation of the apparatus 600, the fluid (e.g., air, liquid, gas, etc.) may flow through the first through-hole 5 of the central shaft 2 to facilitate cooling of the central shaft 2. Cooling the central shaft 2 may reduce the impact on the service life of the central shaft 2 caused by excessive temperatures, thereby improving the service life of the apparatus 600.

Figure 7:
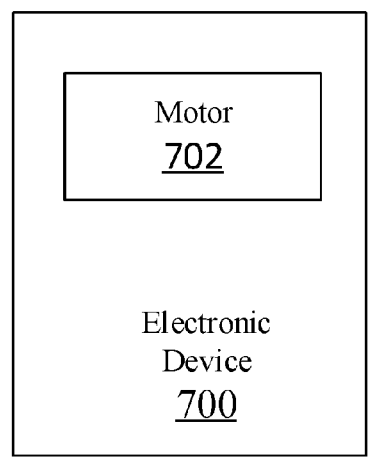
FIG. 7 is a block diagram of an embodiment of an electronic device for cooling.

FIG. 7 is a block diagram of an embodiment of an electronic device 700 for cooling. The electronic device 700 may include a motor 702 which may include any of the devices shown in any of FIGS. 1 through 3.

Figure 8:
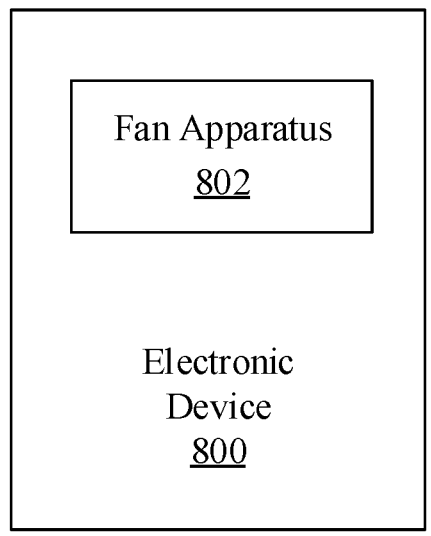
FIG. 8 is a block diagram of another embodiment of an electronic device for cooling.

FIG. 8 is a block diagram of another embodiment of an electronic device 800 for cooling. The electronic device 800 may include a fan apparatus 802 which may include any of the apparatuses shown in any of FIGS. 4 through 6.

The above specification is only made up of specific embodiments of the present disclosure, but a protection scope of the present disclosure is not limited thereto, changes or substitutions easily conceived by anyone familiar with the technical field of the art disclosed by the present disclosure shall fall within a protection scope of the present disclosure. Accordingly, the protection scope of the present disclosure is defined by the claims.

What is claimed is:

1. An apparatus comprising:
   a motor body;
   a shaft extending through the motor body and configured to rotate in response to operation of the motor body, wherein the shaft comprises a first through-hole extending axially between a first end of the shaft and a second end of the shaft, the first through-hole being configured to receive a fluid to cool the motor body; and
   a housing having a second through-hole and a third through-hole opposite the second through-hole, wherein the first end of the shaft extends through the second through-hole and the second end of the shaft extends through the third through-hole.

2. The apparatus of claim 1, wherein the motor body is at least partially disposed in the housing.

3. The apparatus of claim 2, wherein a first axis of the first through-hole and a second axis of the second through-hole correspond to a common axis.

4. The apparatus of claim 2, wherein the motor body is entirely disposed in the housing.

5. The apparatus of claim 2, wherein a diameter of the first through-hole is within a preset range, wherein the preset range is less than or equal to 1 mm.

6. The apparatus of claim 1, further comprising a fan blade coupled to the shaft and configured to rotate in response to rotation of the shaft.

7. The apparatus of claim 6, wherein the fan blade comprises a fan through-hole extending axially between a first end of the fan blade and a second end of the fan blade, and a first end of the shaft extends into the fan through-hole.

8. The apparatus of claim 7, wherein the fan blade is arranged at the first end of the shaft.

9. The apparatus of claim 6, wherein the fan blade comprises a connector for coupling the fan blade to the shaft.

10. A system comprising:
    a motor body;
    a shaft extending through the motor body and configured to rotate in response to operation of the motor body, wherein the shaft comprises a first through-hole extending axially between a first end of the shaft and a second end of the shaft, the first through-hole being configured to receive a fluid to cool the motor body;
    a housing having a second through-hole and a third through-hole opposite the second through-hole, wherein the motor body is at least partially disposed in the housing, the first end of the shaft extends through the second through-hole, and the second end of the shaft extends through the third through-hole; and
    a fan blade coupled to the shaft and configured to rotate in response to rotation of the shaft.

11. The system of claim 10, wherein the fan blade comprises a connector for coupling the fan blade to the shaft.

12. The system of claim 10, wherein a first axis of the first through-hole and a second axis of the second through-hole correspond to a common axis.

13. The system of claim 10, wherein the motor body is entirely disposed in the housing.

14. The system of claim 10, wherein the fan blade comprises a fan through-hole extending axially between a first end of the fan blade and a second end of the fan blade, and a first end of the shaft extends into the fan through-hole.

15. The system of claim 14, wherein the fan blade is arranged at the first end of the shaft.

16. The system of claim 14, wherein a diameter of the first through-hole is within a preset range, wherein the preset range is less than or equal to 1 mm.

17. A device comprising:
    a shaft extending through a motor body and configured to rotate in response to operation of the motor body, wherein the shaft comprises a first through-hole extending axially between a first end of the shaft and a second end of the shaft, the first through-hole being configured to receive a fluid to cool the motor body; and
    a housing having a second through-hole and a third through-hole opposite the second through-hole, wherein the first end of the shaft extends through the second through-hole and the second end of the shaft extends through the third through-hole.

18. The device of claim 17, further comprising a fan blade coupled to the shaft and configured to rotate in response to rotation of the shaft.

19. The device of claim 18, wherein the fan blade comprises a fan through-hole extending axially between a first end of the fan blade and a second end of the fan blade, and a first end of the shaft extends into the fan through-hole.

* * * * *